United States Patent Office 3,272,835
Patented Sept. 13, 1966

3,272,835
PROCESS FOR THE MANUFACTURE OF
BIPYRIDYLS
Philip Brook Dransfield and Michael Hill Watson,
Widnes, England, assignors to Imperial Chemical
Industries Limited, London, England, a corporation of Great Britain
No Drawing. Filed Nov. 6, 1963, Ser. No. 321,657
Claims priority, application Great Britain, Nov. 12, 1962,
42,616/62
25 Claims. (Cl. 260—296)

This invention relates to the manufacture of organic bases, more particularly bipyridyls.

It is known to manufacture bipyridyl by oxidation of a sodium-pyridine interaction product in excess pyridine, but the yields of bipyridyls so formed are substantially short of that theoretically obtainable from the pyridine. Since pyridines are expensive materials, it is clearly desirable to secure as high a conversion efficiency as possible, consistent with economic operating conditions.

We have now found that the metal-pyridine interaction product produced from a dissolved form of metal is especially well suited for conversion to bipyridyls. The solvent for the metal not only greatly facilitates the formation of the metal-pyridine interaction product, but also can improve the quality of product and the efficiency of utilization of the pyridine.

Thus according to our invention we provide an improved process for the manufacture of bipyridyls which comprises oxidising a metal-pyridine interaction product formed from the dissolved form of the metal.

The solution of the metal can be achieved by the use as solvent of a substantially anhydrous liquid medium containing ammonia. Liquid ammonia itself is an efficient solvent for the alkali metals such as sodium and potassium, and is very convenient for use in our process. Inert diluents may be present in the liquid ammonia if desired, however, provided that they are not present in sufficiently high proportions to reduce the solubility of the metal to an inconveniently low level. Suitable inert diluents include most of the organic solvents which are free from substituents which are reactive towards the metal (particularly halogens and hydroxyl groups), for example hydrocarbons, amines and ethers. The metal may be dissolved in the mixture of liquid ammonia and diluent or, more conveniently, the metal may be dissolved first in liquid ammonia and any desired proportion of diluent then added.

The composition of the solvent may be varied to suit the particular metal concerned.

The concentration of metal in the solution is preferably as high as can conveniently be handled. Excessive dilution can be uneconomical on account of the bulk of liquid to be handled and the refrigeration necessary to produce this bulk of liquid ammonia. In general solutions containing 5% to 20% of sodium or potassium can readily be made and handled.

The proportion of pyridine to metal does not need to be much in excess of that theoretically required to react with the metal. Thus in general an alkali metal requires one molar equivalent of the pyridine for each atomic equivalent of the metal, and alkaline earth metals require between one and two molar equivalents of the pyridine for each atomic equivalent of the metal. Larger or smaller proportions may be used, for example an excess of 5 to 10% above this proportion of pyridine, depending upon the particular reaction conditions to be employed. In general, an excess of the metal is wasteful and less convenient but, provided it is adequately removed before the reaction mixture is further processed, it can be used if desired.

When using a mixture of ammonia and liquid organic diluent, suitable proportions are in particular between 1 and 10 parts by weight of the diluent for each part of ammonia. In some circumstances, however, even smaller proportions of ammonia may suffice for adequate solution to be obtained.

The reaction of the dissolved metal with the pyridine is practically instantaneous. The oxidation stage is slower, however, and proceeds at a rate which varies according to the composition of the liquid medium, and, to a lesser extend, on the temperature. Thus, for example, an oxidation may require 5 to 6 hours in liquid ammonia, (approximately —40° C.) or about 2 hours in dimethoxy ethane at —40° C. using a stream of air as oxidant.

The temperature at which the oxidation is carried out may also be varied considerably, but care should be taken, when using oxygen or an oxygen-containing gas as oxidant, that the gaseous mixture in the reaction vessel does not become inflammable or explosive. Some mixtures of oxygen and ethers for example may be dangerous in this way. Accordingly, while we prefer to carry out the oxidation at low temperatures (and especially at a temperature not greater than 20° C., and, if possible, below 0° C.) appropriate selection of temperature and diluent should be made to avoid the risk of this danger arising. The best temperature for the oxidation, we find, is in the range —20° C. to —30° C., which is in the neighbourhood of the boiling point of liquid ammonia; the yield of 4:4-bipyridyl is then especially good.

The principal examples of metals which can thus be used in solution are the alkali metals, though alkaline earth-metals may also be used. In general, sodium or potassium is most suitable; lithium and calcium are less convenient, and rubidium and caesium are too expensive for commercially economic use. Single metals or mixtures thereof may be used.

The pyridine for use in the process of our invention should preferably be as free as practicable from any substituent or impurity which can take part in any undesirable side reaction with the alkali metal or the ammonia. The process is especially applicable to pyridine itself, though pyridines containing hydrocarbon radicals as substituents (particularly alkyl radicals, for example methyl and/or ethyl radicals) may also be used. The position of the substituents in the pyridine ring may affect the reactivity of the pyridine considerably, however. In general, substituents in the 2 and 6 positions of the pyridine ring have least effect, while substituents in the 3 and 4 positions may impede reaction considerably. Suitable substituted pyridines include α-picoline (2-methyl pyridine), 2-ethyl pyridine, 2:6-dimethyl pyridine and 2-methyl-6-ethyl pyridine.

If appreciable amounts of metal-reactive impurities are present in the reaction mixture, for example in the pyridine or diluent used, these can be removed by use of an appropriate excess of metal, though the overall efficiency of the process may thereby be reduced. Accordingly, it is preferred that the materials used should be as free as possible from such impurities, particularly from materials containing active hydrogen. Ethers, for example, may be purified by distillation over sodium.

In its simplest form, our process comprises mixing a solution of the metal with the pyridine, and then oxidising the suspension or solution of the metal-pyridine interaction product so formed. The pyridine may be dissolved in a solvent, which may be for example liquid ammonia and/or an organic diluent. Oxidation may be carried out by blowing a stream of oxygen (for example as air) into the mixture, or by adding an oxidising agent, such as a perborate, persulphate, bromine, permanganate, dichromate, nitrobenzene or a pyridine N-oxide. Care should be taken to avoid inconvenience as a result of freezing of any of the liquid used at low temperatures.

One preferred form of the process, which has the advantage of giving an improved conversion of pyridine to bipyridyls, is that in which the oxidation is carried out during the formation of the metal-pyridine interaction product. This can be carried out conveniently by blowing a stream of air or oxygen into the pyridine or a solution of pyridine in a solvent or diluent, for example in liquid ammonia, to which a solution of the metal is added at a rate sufficient to maintain a steady and controlled reaction. In this form of our process, higher proportions of metal to pyridine may be used with consequent improvement in the efficiency of conversion of the pyridine to bipyridyls.

It may be advantageous when using oxygen (or air) as the oxidising agent to saturate the pyridine-diluent mixture with the oxygen (or air) before or, in particular, after commencing addition of the metal solution. This can enhance the yield of bipyridyl.

In these reactions, the mixture can be kept cold during the metal-pyridine interaction and/or during the oxidation stage by evaporation of liquid ammonia from the mixture at substantially atmospheric pressure. In this way, the mixture does not overheat, and the reactions do not get out of control. Additional cooling, before or during reaction, may be applied if desired. The heat-absorbing properties of the liquid ammonia medium, together with the rapid reaction of the metal in dissolved form, practically eliminate the fire hazard which could otherwise arise from the inflammable nature of the metal and/or metal-pyridine interaction product in air.

A very convenient method of operation, which has the advantage of allowing oxidation to take place at higher temperatures without risk of high pressure building up, is that in which some or all of the ammonia is allowed to boil off from a suspension of metal-pyridine interaction product in a mixture of liquid ammonia and a liquid diluent, before oxidation is carried out. The ammonia can be recovered for re-use if desired.

The procedure which we find is usually most advantageous is that in which the metal-pyridine interaction product is formed in one zone from the metal solution and the pyridine and then the resultant suspension of metal-pyridine interaction product is passed on rapidly to a second zone in which the oxidation is carried out. This procedure lends itself very well to continuous operation.

In general, we find that thorough dispersion of the oxidising gas in the reaction mixture and high proportions of oxygen in the oxidising gas tend to favour improved yields of the bipyridyl, calculated on the basis of the pyridine consumed. In particular, we prefer to use as oxidant a gas containing at least 30% by volume of oxygen. The maximum proportion of oxygen usable is generally determined by the considerations of inflammability or explosion referred to above.

During the oxidation stage, it is advantageous to have present an ether as diluent. Suitable ethers for this purpose include in particular polyethers in which two ether oxygen atoms are separated by a chain of two carbon atoms. It is preferred that the ether should contain in its structure at least one terminal methoxy group. Thus there may be used for example, ethers of tetrahydrofurfuryl alcohol (for example the methyl ether) and diethers of ethylene glycol, and especially 1:2-dimethoxyethane, bis-(2-methoxyethyl) ether and 1:2-bis(2-methoxyethoxy) ethane. Of these we find that bis-(2-methoxyethyl) ether is most suitable. The exact function of the ethers is not clear, but it appears that they allow an increased rate of oxygen uptake, a quicker reaction and a higher conversion to bipyridyls. This diluent may be present at the initial stage of interacting the metal solution and the pyridine or may be added later so as to be present at the oxidation stage.

When the diluent is present during the formation of the metal-pyridine interaction product, suitable proportions are those already mentioned. Particularly when the diluent is added after the interaction stage or ammonia is removed after the interaction stage, it may be more convenient to determine the proportion of the diluent relative to the metal pyridine interaction product; especially suitable proportions of diluent are those in the range 4 to 10 parts by weight for each part of metal-pyridine interaction product.

Commonly a mixture of isomeric bipyridyls is formed by the prior art processes, the principal constituent being the 2:2'-, 2:4' and 4:4'-isomers or such of these are permitted by the structure of the pyridine used as starting material. By the process of the present invention, however, the 4:4'-isomer is formed almost exclusively, especially when the interaction temperature is low.

The bipyridyls may be isolated from the reaction mixture by known means, for example by fractional distillation or crystallisation, extraction with organic solvents or combinations of such techniques. The isolation of bipyridyls is very much simplified by the fact that the process of the present invention produces practically none of the impurities or side products of similar or higher boiling point than the bipyridyls, such as are commonly formed in prior art methods.

In some instances when the liquid medium is suitably cooled to low temperatures such as those of liquid ammonia at atmospheric pressure, considerable proportions of the bipyridyl separate out by crystallisation directly from the oxidation mixture. This may be recovered by filtration, and the residue remaining in solution may be recovered by conventional means or may be recycled to the commencement of the process.

The process of our invention has the advantage of giving excellent conversion efficiency, in some instances as high as 95% of theory, of pyridine to bipyridyls. Also, the temperatures of interaction obtainable by use of solutions in liquid ammonia favour the formation of the 4:4-bipyridyl almost exclusively. The whole reaction of our process gives a much cleaner product than any of the prior art processes, and very light-coloured bipyridyls can be isolated directly without any need for conventional purification and decolourisation procedures. The process is also very well suited to continuous operating techniques.

The invention is illustrated but not limited by the following examples in which the parts and percentages are by weight.

*Example 1*

A mixture of 250 grams of 1:2-dimethoxyethane (purified by refluxing with sodium for 1 hour, and then fractional distillation and collection of the fraction boiling at 84–85° C.) and 45 grams of dry pyridine (water-content approximately 0.03%) was cooled to −40° C. under a dry argon atmosphere. A mixture of dry air (10 litres per hour) and argon (20 litres per hour) was then blown through the pyridine/dimethoxy ethane mixture for 15 minutes. 12.5 grams of clean sodium metal were dissolved in 150 ml. of liquid ammonia (dried by distillation from sodium, and sparged with dry argon for 20 minutes) at −45° C., and the resulting solution was added to the pyridine/dimethoxy ethane mixture, with continued argon/air flow, at a rate sufficient to maintain the reaction mixture at a pale buff colour. Too rapid a rate of sodium addition was shown by darkening of the reaction mixture to a purple/brown colour. The air flow was gradually increased during the sodium addition and the argon flow correspondingly reduced until, after 2 hours, only air was admitted to the reaction vessel. The sodium addition required approximately 3 hours, and the temperature of the reaction mixture was kept fairly constant at −45° C. by evaporation of part of the liquid ammonia.

The reaction mixture was then allowed to warm to atmospheric temperature and most of the ammonia was removed by evaporation. The residue consisted of a pale straw-coloured organic layer from which a flocculent pale-buff precipitate partly settled. 50 ml. of water were then added, with external cooling, and the buff solid was coagulated and collected by filtration.

The product, weighing 8.74 grams, was found by analysis to consist essentially of 4:4′-bipyridyl. No other isomers were detected (by gas-liquid chromatography). Pyridine consumed was 15.7 grams. The conversion of pyridine to 4:4′-bipyridyl was 19.7%, and the yield of 4:4′-bipyridyl, based on the pyridine consumed, was 56.2% of theory.

As an alternative method for isolating the product, the organic layer remaining after the evaporation of ammonia was distilled first at 760 mm. pressure and then for a short period of 20 mm. pressure to complete the removal of low-boiling material. The residue, which was a pale yellow-brown oil which solidified readily on cooling, was purified by extraction with boiling water (in a volume equal to that of the organic layer taken), filtration to remove undissolved materials, and crystallisation of the product as small, pale buff needles. This product was purified further by solution in hot water (half the volume previously taken), treatment with decolourising carbon, and crystallisation. The resulting product (M.P. initially 77–78° C., M.P. 112–3° C. after drying at 70° C.) represented a recovery of 68% of the 4:4′-bipyridyl present.

Example 2

The procedure of Example 1 was repeated using an increased amount of sodium sufficient to provide a sodium:pyridine mole ratio of 3:1.

4:4′-bipyridyl was thus obtained in a yield of 67% of theory based on the pyridine consumed, and with a 40% conversion of pyridine to the bipyridyl.

The isolation of the 4:4′-bipyridyl was carried out by cooling to −70° C. the organic layer remaining after evaporation of most of the ammonia from the reaction mixture. An amount of 4:4′-bipyridyl, equivalent to 75% of that estimated by analysis to be present, crystallised as small white crystals and was collected by filtration. The remainder of the 4:4′-bipyridyl was obtained by distilling off the solvent and pyridine from the filtrate and dissolving the residue in hot water; the 4:4′-bipyridyl crystallised out as white crystals on cooling. There were no polymeric residues formed, and no carbon treatment of the product was necessary.

Example 3

A closed reaction vessel was purged with dry argon, cooled to −40° to −50° C., and then charged with 31 parts of liquid ammonia. 0.57 part of sodium was added, and to the blue solution thus formed dry pyridine was added from a graduated vessel until the blue colour was just discharged. Approximately 1.79 parts of pyridine were required for this, and a yellow solid was precipitated from the reaction mixture. A further 0.02 part of sodium, dissolved in liquid ammonia, was then added to adjust for a slight excess of sodium (as shown by a green colouration).

The liquid ammonia was then allowed to evaporate and, when most of it had gone, 34.5 parts of 1:2-dimethoxy ethane (cooled to approximately −30° C.) were added so as to give a suspension of the yellow solid in the ether. The mixture was then maintained at −10° to −20° C. while an argon/air (50/50) mixture was passed through it, the gas flow being adjusted to keep the colour of the reaction mixture as pale as possible. The gas flow was maintained for 2 hours, during which time the argon flow was progressively reduced until, in the later stages of the oxidation, only air was passing through.

The reaction mixture was sampled and analysed by gas-liquid chromatography for bipyridyls and pyridine. Thus it was found that 0.45 part of 4:4′-bipyridyl was formed, and that 0.96 part of pyridine has been consumed. This corresponds to a 25.8% conversion of pyridine to 4:4′-bipyridyl and a 47.9% yield of 4:4′-bipyridyl based on the pyridine consumed. No other bipyridyl isomers were detected (i.e. any present must be less than 3%).

The materials used in this example were of the same quality as used in Example 1.

Example 4

The procedure of Example 2 was repeated using α-picoline in place of pyridine. Analysis of the reaction product by gas-liquid chromatography showed the presence of 0.22 part of 2:2′-dimethyl-4:4′-bipyridyl for each 1.7 parts of α-picoline used. The product contained a small proportion (less than 10% of the bipyridyls) of another isomer. Conversion to dimethyl-bipyridyls was approximately 13% of theory.

Example 5

1.02 parts of potassium metal, in small pieces, was added to a mixture of 2 parts of pyridine and 34.5 parts of 1:2-dimethoxy ethane (as used in Example 1) maintained at −50° C. under a dry argon atmosphere, and liquid ammonia (approximately 38.5 parts) was added until speedy reaction started. A pale yellow-green solid precipitated gradually from the reaction mixture over a period of 1 hour. The resulting mixture was then oxidised at a temperature of −10° to −20° C. as in Example 3.

Analysis of the product showed that 0.69 part of pyridine was consumed and 0.36 part of 4:4′-bipyridyl was formed. This corresponds to a yield of 53% of theory and a 19% conversion of pyridine to 4:4′-bipyridyl. No other isomers were detected (i.e. any present must be less than 3%).

Example 6

0.6 part of sodium was gradually added to 1.96 parts of pyridine in 38.5 parts of liquid ammonia at −45° C. while the reaction vessel was continuously shaken and the mixture was continuously sparged with a dry air/argon mixture (containing approximately 30% air in argon). The sodium addition was regulated over a period of approximately three hours so as to keep the colour of the reaction mixture pale brown (i.e. fully oxidised) rather than violet (i.e. partly oxidised).

Ammonia was then evaporated from the reaction mixture at atmospheric temperature, and the solid residue was extracted with benzene (26.5 parts), thus giving a pale straw-coloured benzene solution and a white solid residue. The benzene solution was analysed by gas-liquid chromatography, and was found to contain 0.27 part of 4:4′-bipyridyl. The pyridine consumed was found to be 1.18 parts. 4:4′-bipyridyl was thus formed in 23.2% yield, and the conversion of pyridine to 4:4′-bipyridyl was 14%. The bipyridyl product was found to contain less than 10% of other isomers.

Example 7

A mixture of 200 grams of 1:2-dimethoxy ethane (purified by refluxing with sodium for 3 to 4 hours and then fractional distillation and collection of the fraction boiling at 84 to 85° C.) and 40 grams of dry pyridine (water content approximately 0.01%) was cooled to −45° C. under a dry argon atmosphere. A stream of dry air (40 litres per hour) was then blown through the pyridine/dimethoxy ethane mixture for 15 minutes. 12.5 grams of clean sodium metal were dissolved in 150 ml. of liquid ammonia (dried by distillation from sodium) and sparged with dry argon for 20 minutes at −45° C., and the resulting solution was added to the pyridine/dimethoxy ethane mixture, with continued air flow, at a rate sufficient to maintain the reaction mixture at a pale buff colour. Too rapid a rate of sodium addition was shown by darkening of the reaction mixture to a purple/brown colour. The sodium addition required approximately two hours, and the temperature of the reaction mixture was kept fairly constant at −45° C. by evaporation of part of the liquid ammonia.

The reaction mixture was then allowed to warm to atmospheric temperature and most of the ammonia was removed by evaporation. The residue consisted of a pale straw-coloured organic layer from which a flocculent pale buff precipitate partly settled. 50 ml. of water were then added, with external cooling, and the buff solid was coagulated, collected by filtration and washed with small quantities of 1:2-dimethoxy ethane. The filtrate was then analysed for bipyridyls and pyridine by gas-liquid chromatography. The conversion of pyridine to 4:4'-bipyridyl was thus found to be 40% of theory, and the yield of 4:4'-bipyridyl to be 69.4% of theory based on the pyridine consumed.

The 4:4'-bipyridyl was isolated by cooling the organic layer to −70° C., whereupon white crystals slowly separated over a period of several hours. These crystals were filtered off at −70° C. and dried at 100° C. to constant weight (stage 1). The crystals had melting point 68–69° C. before drying and 110–114° C. after drying (pure 4:4'-bipyridyl hydrate melts at 72° C. and the anhydrous form at 114° C.). The filtrate was then distilled at atmospheric pressure and finally under reduced pressure (approx. 20 mm. vacuum, boiler temperature not exceeding 130° C.) and the pale yellow oily residue, which set to a solid on cooling, was dissolved in hot water and crystallised out on cooling as long white needle-shaped crystals (M.P. 106–110° C. after drying at 100° C.) (stage 2).

When treated in this way, a portion of the organic layer estimated by analysis to contain 2.75 parts of 4:4'-bipyridyl gave 2.1 parts of solid in stage 1, 0.43 parts of solid in stage 2 and (by analysis) 0.2 part in the aqueous filtrate from stage 2, this accounting for a total of 2.74 parts. No other isomers of 4:4'-bipyridyl were detected in the product or filtrate, and the product was estimated by gas-liquid chromatography to be 95–100% pure.

*Example 8*

A solution of sodium in liquid ammonia was added to a mixture of pyridine and solvent, in the manner of Example 1, while a stream of oxidising gas was passed through the mixture with thorough agitation.

The materials used, their proportions, and the yields of 4:4'-bipyridyl, are summarised in the following table. The oxidising gas was air or a mixture of air with additional oxygen.

tion contains a diluent inert to said metal, said diluent containing no halogen and hydroxyl groups.

3. Process as claimed in claim 1 wherein the metal is an alkali metal.

4. Process as claimed in claim 3 wherein the metal is sodium.

5. Process as claimed in claim 1 wherein the pyridine is pyridine itself.

6. Process as claimed in claim 1 wherein the proportion of the pyridine used is substantially that required for reaction with the metal.

7. Process as claimed in claim 6 wherein the metal is used as a solution containing a proportion of metal in the range 5% to 20% by weight.

8. Process as claimed in claim 1 wherein the oxidation of the metal-pyridine interaction product is carried out by means of oxygen.

9. Process as claimed in claim 8 wherein the oxidation is carried out by means of a gas containing at least 30% by volume of oxygen.

10. Process as claimed in claim 1 wherein the oxidation is carried out at a temperature not greater than 20° C.

11. Process as claimed in claim 10 wherein the oxidation is carried out below 0° C.

12. Process as claimed in claim 11 wherein the oxidation is carried out at a temperature in the range −20° C. to −30° C.

13. Process as claimed in claim 1 wherein the oxidation is carried out in the presence of a liquid organic diluent.

14. Process as claimed in claim 13 wherein the diluent is an ether.

15. Process as claimed in claim 14 wherein the ether is a polyether in which two ether oxygen atoms are separated by a chain of two carbon atoms.

16. Process as claimed in claim 14 wherein the ether contains in its structure at least one methoxy group.

17. Process as claimed in claim 14 wherein the ether is a di-ether of ethylene glycol.

18. Process as claimed in claim 17 wherein the ether is bis-(2-methoxyethyl)ether.

19. Process as claimed in claim 14 wherein the ether is an ether of tetrahydrofurfuryl alcohol.

20. Process as claimed in claim 12 wherein the ether is present during the metal-pyridine interaction.

| Solvent | Molar ratio Na/Pyridine | Solvent/ pyridine ratio | Oxygen percent content of oxidising gas | Reaction temperature, ° C. | Percent Yield of 4:4-bipyridyl | | |
|---|---|---|---|---|---|---|---|
| | | | | | On pyridine consumed | On pyridine fed in | On sodium |
| 1:2 Dimethoxy ethane | 2:1 | 8:1 | 10 | −35 to −25 | 60 | 26 | 13 |
| | 2:1 | 10:1 | 20 | −30 to −10 | 81 | 45 | 22.5 |
| Bis-(2-methoxyethyl) ether | 2:1 | 10:1 | 20 | −30 to −11 | 84 | 34 | 17 |
| | 2:1 | 10:1 | 20 | −30 to −20 | 92 | 52 | 26 |
| | 1:1 | 10:1 | 33.3 | −30 to −25 | 95 | 15 | 15 |
| | 1:1 | 10:1 | 40 | −30 to −20 | 103 | 19 | 19 |
| | 2:1 | 10:1 | 40 | −30 to −10 | 96 | 32 | 16 |
| Methyl ether of tetrahydro furfuryl alcohol. | 2:1 | 10:1 | 20 | −30 to −20 | 67 | 20 | 10 |
| | 2:1 | 10:1 | 20 | −30 to −10 | 81 | 19.4 | 10 |
| | 2:1 | 10:1 | 40 | −30 to −10 | 87 | 17 | 8.5 |

What we claim is:

1. In a process for the manufacture of a bipyridyl by reaction of a metal selected from the group consisting of alkali metals and calcium and a pyridine to form a metal-pyridine interaction product and oxidizing said interaction product to bipyridyl, the improvement which comprises using a solution of said metal in liquid ammonia for reaction with the pyridine to form said interaction product.

2. A process according to claim 1 wherein said solu-

21. Process as claimed in claim 20 wherein the metal is dissolved in liquid ammonia and the proportion of the organic diluent is in the range 1 to 10 parts by weight for each part of ammonia used in the metal solution.

22. Process as claimed in claim 21 wherein the proportion of organic diluent is in the range of 4 to 10 parts by weight for each part of the metal pyridine interaction product.

23. Process as claimed in claim 1 which comprises mixing a solution of the metal with the pyridine and then oxidising the metal-pyridine interaction product so formed.

24. Process as claimed in claim 1 wherein the oxidation is carried out during formation of the metal-pyridine interaction product.

25. Process as claimed in claim 1 wherein the metal-pyridine interaction product is formed in one zone and is then passed on to a second zone in which the oxidation is carried out.

No references cited.

WALTER A. MODANCE, *Primary Examiner.*

ROBERT T. BOND, *Assistant Examiner.*